United States Patent [19]
Boyle et al.

[11] Patent Number: 5,202,786
[45] Date of Patent: Apr. 13, 1993

[54] OPTICAL SWITCHING DEVICES

[75] Inventors: Michael E. Boyle, Burke; James S. Shirk, Alexandria, both of Va.

[73] Assignee: The United States of America as represented by the Secretary of the Navy, Washington, D.C.

[21] Appl. No.: 758,143

[22] Filed: Sep. 12, 1991

[51] Int. Cl.⁵ .......................... G02F 1/35; F21V 9/04; G03C 1/00
[52] U.S. Cl. ................................. 359/243; 359/241; 359/321; 385/5; 372/11
[58] Field of Search ............... 359/241, 243, 244, 321; 385/122, 5; 356/234, 235; 372/21, 11

[56] References Cited

U.S. PATENT DOCUMENTS

| | | | |
|---|---|---|---|
| 4,333,876 | 6/1982 | Elliott et al. | 260/245.73 |
| 4,432,612 | 2/1984 | Nicholson et al. | 359/321 |
| 4,571,029 | 2/1986 | Skotheim et al. | 359/321 |
| 4,804,930 | 2/1989 | Alavashi | 359/241 |
| 4,854,676 | 8/1989 | Kalyanaraman et al. | 372/21 |
| 4,913,845 | 4/1990 | Gillberg-LaForce et al. | 252/582 |
| 5,087,390 | 2/1992 | Sounik et al. | 252/587 |

FOREIGN PATENT DOCUMENTS 9107658 5/1991 World Int. Prop. O. .

OTHER PUBLICATIONS

Shirk et al; Appl. Phys. Lett., vol. 55, #13, pp. 1287-1288, Sep. 25, 1989; abst. only provided.
Thi et al; Chem. Phys. Lett., vol. 139, #2, pp. 207-211, Aug. 21, 1987; abst. only supplied.
Oliver et al; SPIE, Int. Soc. Opt. Eng., Jul. 13, 1990, vol. 1337, pp. 81-88, Abst. Only Supplied.

*Primary Examiner*—Nelson Moskowitz
*Attorney, Agent, or Firm*—Thomas E. McDonnell; Barry A. Edelberg

[57] ABSTRACT

An optical switching device employs a rare earth bis-phthalocyanine having good third-order nonlinear susceptibilities. In a preferred optical switch, the rare earth bis-phthalocyanine is employed as a nonlinear optical material body that fills the space between two partially reflecting mirrors. When light incident on the switch is below a given intensity level, light passes through the switch and the switch is in an open state. When light is above a given intensity level, light is trapped in the nonlinear optical material and the switch is in a closed state.

11 Claims, 1 Drawing Sheet

OPTICAL SWITCHING DEVICES

BACKGROUND OF THE INVENTION

1. Technical Field

The present invention relates to improvements in light controlled optical switching devices.

2. The Prior Art

Research into optical switching devices, i.e., devices wherein light controls light, is one of the most intriguing research areas in modern laboratories. In this regard, there is a great deal of work underway in developing materials that will permit the construction of such devices. These materials are generally known as nonlinear optical materials. In particular, so-called "third-order nonlinear optical materials" are required for all-optical device constructions. Therefore, there exists a need to develop materials with enhanced third-order nonlinear optical susceptibilities for use in such optical switching devices.

Lanthanide bis-phthalocyanines have been known and studied for more than 25 years with most of the early research being focussed on their electrochemistry and their potential for use as electrochromic materials for display devices. Recent mass spectroscopy, magnetic susceptibility and ESR measurements indicating that these molecules are stable free radical systems, and demonstrations as to the intrinsic molecular semiconductor nature of the lanthanide bis-phthalocyanines, have generated renewed interest in the materials. Lutetium bis-phthalocyanine (Lu(Pc)$_2$) is the first reported molecular semiconductor and has been used to construct field-effect transistors.

SUMMARY OF THE INVENTION

It is an object of the invention to provide an optical switching device using a material having enhanced third-order nonlinear susceptibility.

In accordance with the invention, an optical switching device is provided which includes a nonlinear optical material comprising a rare earth bis-phthalocyanine.

According to a preferred embodiment, the optical switch of the invention comprises: first and second partially reflecting mirrors separated by a cavity therebetween; and a body of nonlinear optical material comprising a rare earth bis-phthalocyanine, which substantially fills the cavity between the mirrors, the optical switch providing, in response to light incident on the optical switch being of an intensity below a given level, an open state wherein most of the incident light passes through the optical switch, and the optical switch providing, in response to the light incident on the optical switch being of an intensity above the given level, a closed state wherein the incident light does not pass through the optical switch.

Other features and advantages of the invention will be set forth in, or apparent from, the following detailed description of preferred embodiments of the invention.

DETAILED DESCRIPTION OF THE INVENTION

Figure 1:
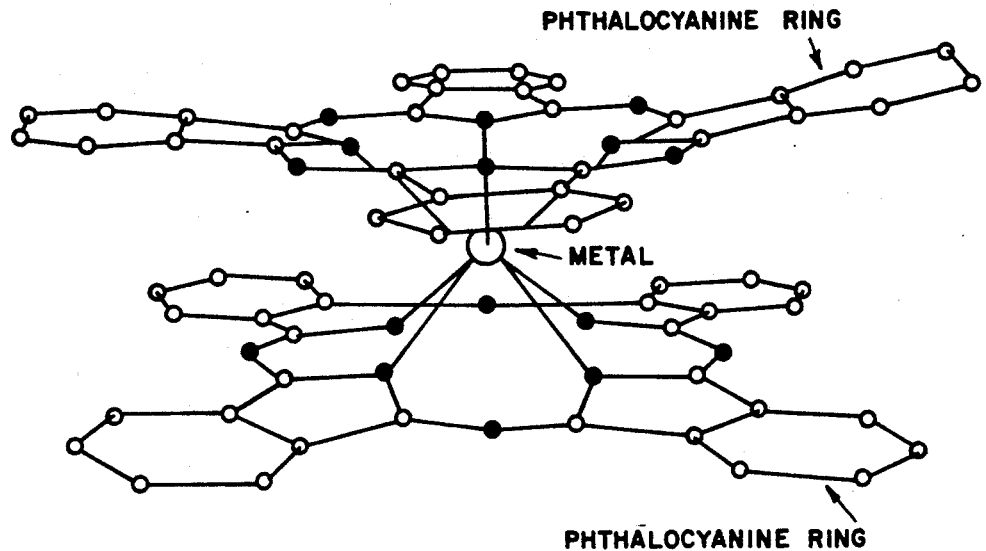
FIG. 1 is a schematic diagram of a rare earth bis-phthalocyanine molecule.

Our recent work with rare earth or lanthanide bis-phthalocyanines such as lutetium, gadolinium, and neodymium bis-phthalocyanine, has demonstrated significant enhancement in nonlinear optical responses as compared to most other off-resonant organic-based materials. Referring to FIG. 1, which is a schematic regeneration of a rare earth molecule, x-ray diffraction studies of lutetium bis-phthalocyanine (Lu(Pc)$_2$) and neodymium bis-phthalocyanine (Nd(Pc)$_2$) have demonstrated that these molecules are sandwich-type compounds where the lanthanide metal ion (M$^{+3}$) is eight-fold coordinated to nitrogens in the phthalocyanine rings. These macrocyclic rings are staggered at 45° with respect to each other. In Lu(Pc)$_2$, both of the phthalocyanine rings are convex with one ring more distorted from planarity than the other. The lutetium ion is located slightly closer (0.0050 Å) to the less distorted ring. In the case of Nd(Pc)$_2$, the x-ray studies indicate that one of the phthalocyanine rings is saucer-shaped while the other is planar. Unfortunately, these molecular geometry determinations do not allow for discrimination between the possible localization of the unpaired spin on one ring or its delocalization over both rings.

The UV-VIS spectral absorption features of solutions of lanthanide bis-phthalocyanines were initially interpreted as arising from the localized model, i.e., as the sum of the spectra of a non-interacting phthalocyanine rings: (Pc$^{-2}$) and a radical phthalocyanine ring (Pc$\cdot$). An additional spectral feature, a broad absorption in the near IR, was assigned as an intramolecular charge-transfer band where the dianion phthalocyanine ring was suggested to act as an electron donor and the radial mono-ion phthalocyanine ring as an electron acceptor. The absorption maximum of the intervalence band depends of the rare-earth ion in bis-phthalocyanine systems: as the ionic radius increases, the absorption maximum is shifted to lower energy (higher wavelength). Similar intervalence bands and metal substituent effects have been observed in a number of lanthanide bis-porphyrin systems.

More recent calculations and experimental studies have demonstrated that the optical spectra of the bis-phthalocyanines cannot be simply explained as the sum of the absorption spectra of the independent ring systems, i.e., there is a significant amount of ring-to-ring interaction occurring in these molecules. The extent of inter-ring interaction has been described in Even et al., *Chem. Phys. Lett.* 156 (1989) 609 (the entirety of which is incorporated herein by reference), in which the intervalence transition of Lu(Pc)$_2$ (at 1382 nm) is analyzed using a mixed-valence model. It is further stated that the unpaired electron is strongly delocalized and that the molecule is close to a class III mixed valence system.

The third-order molecular susceptibilities for rare earth bis-phthalocyanines are significantly greater than for substituted transition metal phthalocyanines. The third-order molecular susceptibilities for lutetium, gadolinium and neodymium bis-phthalocyanines are respectively 2800 times, 1500 times and 1500 times that of carbon disulfide, a standard material. This translates to a factor of four increase over reported measurements on substituted transition metal phthalocyanines.

Figure 2:
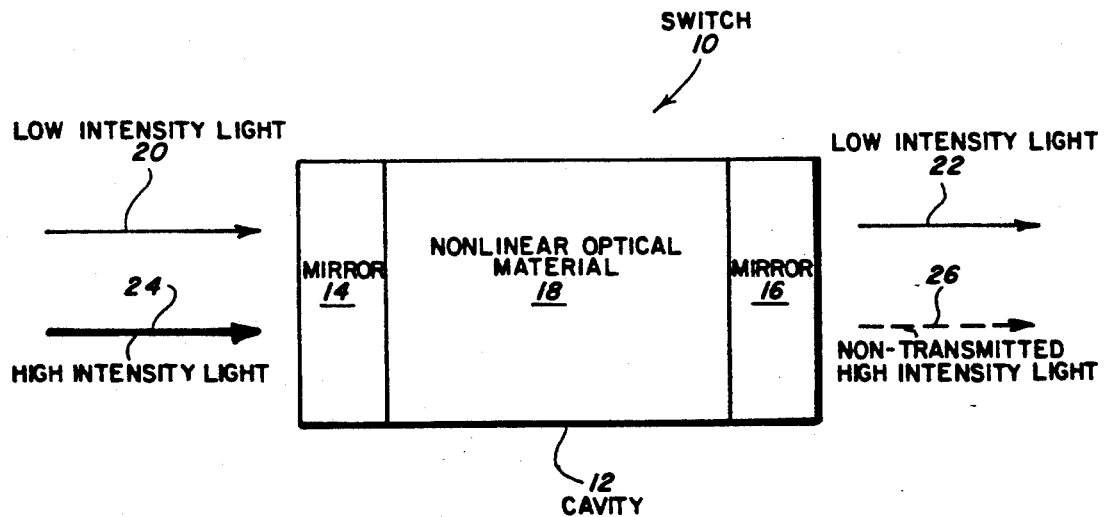
FIG. 2 illustrates in diagrammatic form an optical switch according to the invention.

The rare earth bis-phthalocyanines employed in accordance with the invention can be used in all optical switching-based devices. A preferred nonlinear optical device in which the rare earth bis-phthalocyanines of the invention can be used is a bistable system such as a Fabry-Perot interferometer which is illustrated in FIG. 2. A bistable device is a system or device that has two stable outputs for a wide range of inputs. The Fabry-Perot interferometer illustrated in FIG. 2 is designed to control light of one wavelength.

Referring to FIG. 2 in the illustrated device, a nonlinear optical resonator or switch 10 is prepared by capping off or otherwise forming a cavity 12 with a pair of partially reflecting mirrors 14 and 16 located at each end of cavity 12. The cavity length is chosen so that the device is tuned slightly off-resonant when filled with a nonlinear optical material 18. That is, the cavity length is not an integral number of half-wavelengths of light. Nonlinear optical material 18 may be a solid or a solution of a rare earth bis-phthalocyanine. When nonlinear optical material 18 is a solution, the solvent is chosen so that the solution has good nonlinear and linear optical properties. Typical solvents useful in the present invention are $CHCl_3$, $CH_2Cl_2$, toluene, benzene and tetrahydrofuran (THF). The preferred solvent is chloroform. The concentration of the solution is dependent on the solvent and particular rare earth bis-phthalocyanine used. In the experiments performed to date, the maximum concentration of the solution has been about $2 \times 10^{-4}M$. At higher concentrations, too much scattering occurred for nonlinear optical measurements. The index of refraction of the nonlinear optical material varies with incident light intensity so that at low incident intensity, indicated by an arrow 20 at the left of FIG. 2, the light passes through the device essentially unchanged, as indicated by an arrow 22 which is located at the right of FIG. 2 and which is similar to arrow 20. When light passes through the device 10 in this manner, optical switch 10 is open. At high incident light intensities, indicated by a thick arrow 24 at the left of FIG. 2, the index of refraction of nonlinear optical material 18 changes causing the system to approach a resonant condition with cavity 12. Being closer to resonance, the intensity of the light in cavity 12 is increased making the index of refraction change even more, thereby resulting in a condition of closer resonance and so on. This feedback mechanism eventually results in the trapping of most of the light in cavity 12, as indicated by a phantom or dashed line arrow 26 which is located at the right of FIG. 2 and which represents the light output from device 10. In this condition, optical switch 10 is closed. Once the intensity of the incident light falls below a threshold limit, switch 10 will reopen. However, because of the magnifying effect of the resonant cavity 12, the light intensities at which optical switch 10 opens and closes are not the same, i.e., optical switch 10 will exhibit hysteresis.

While the device discussed above is for controlling light of one wavelength, other nonlinear Fabry-Perot resonators can be envisaged where two different wavelengths are used. For example, one wavelength can be used to control the optical length of the cavity by being absorbed while the second transparent wavelength is switched on and off. A number of other variations on this basic theme are also possible.

Having described the invention, the following examples are given to illustrate specific applications of the invention including the best mode now known to perform the invention. These specific examples are not intended to limit the scope of the invention described in this application.

EXAMPLES

Example 1

The bis-phthalocyanines used in this example were synthesized by a procedure similar to the one described in Kirin et al., *Russ. J. of Inor. Chem.* 10 (1965) 1065 (the entirety of which is incorporated herein by reference). A rare-earth acetate and phthalonitrile (1:10 molar ratio) were heated in a sealed, evacuated tube at 300.C until the mixture congealed to a solid mass (about 2-3 hours). The crude product was then removed and ground to a fine powder, extracted with chloroform and evaporated to dryness. The extracted powder was then sequentially refluxed twice with 20 ml quantities of glacial acetic acid, washed with water and dried. The product was purified by alumina column chromatography (Wohelm, neutral, activity 1, packed in toluene) with chloroform elution as a dark green bis-phthalocyanine band and isolated by reprecipitation in methanol.

Material purity was confirmed by infrared spectroscopy and determinations of the molar extinction coefficient associated with the "Q" band.

Synthesis of lutetium bis-phthalocyanine, using a modified version of the method described in De Cian et al., *Inor. Chem.* 24 (1985) 3162 (the entirety of which is incorporated herein by reference), produced the same material. The modification involves glacial acetic acid refluxing and use of an alumina column. Using chloroform, the bis-phthalocyanine elutes as a green band. Attempts at eluting the mono-phthalocyanine have not been successful to date and up to now, only lutetium bis-phthalocyanine has given a reasonable yield with this technique.

Lutetium and scandium bis-phthalocyanine anions were prepared by the addition of $N_2H_4$ to a solution of the bis-phthalocyanine ($2 \times 10^{-4}M$ in $CHCl_3$) The final solutions were 2% (v/v) hydrazine to bis-phthalocyanine solution. The addition of the hydrazine changes of the solution from a dark green to a blue color. The cation solution of the scandium bis-phthalocyanine was prepared by the addition of concentrated $HNO_3$ and was brown. The final solution was 4% (v/v) $HNO_3$ to bis-phthalocyanine solution.

The radical nature of the lutetium bis-phthalocyanine was confirmed by ESR measurements. A spin density of $10^{21}$ for $LuPc_2$ was measured using a $Mn^{+2}$ standard and double integration, which is of the same magnitude as the literature value of one spin per $LuPc_2$ unit. No signal was detected during ESR measurements of the lutetium bis-phthalocyanine anion solution, indicating the destruction of the free radical nature of the parent material.

Example 2

Various solutions of bis-phthalocyanines were tested for their optical properties. The table below lists results of tests which were performed on $ScPC_2$, $LuPc_2$, $YbPc_2$, $YPc_2$, $GdPc_2$, $EuPc_2$ and $NdPc_2$. The apparatus used to make these measurements is described in Shirk et al., *Applied physics Letters*, Vol. 55, No. 13, pp. 1287-1288 (1989) (the entirety of which is incorporated herein by reference).

TABLE 1

OPTICAL AND NONLINER OPTICAL PROPERTIES OF THE BIS-PHTHALOCYANINES

| | $\gamma$ $10^{-32}$ (emu) | $\lambda_{max}^{a}$ nm | $\sigma_{1064}$ $10^{-20}$ (cm$^2$) | $\chi^{(3)}_{xxxx}/\alpha$ $10^{-13}$ (esu-cm) |
|---|---|---|---|---|
| ScPc$_2$ | 48 | 1190 | 2800 | 0.6 |
| LuPc$_2$ | 34 | 1380 | 1100 | 1 |
| YbPc$_2$ | 41 | 1390 | 1200 | 1 |
| YPc$_2$ | 26 | 1420 | 520 | 2 |
| GdPc$_2$ | 22 | 1580 | 470 | 2 |
| EuPc$_2$ | 22 | 1610 | 1420 | 2 |
| NdPc$_2$ | 15 | 1740 | 450 | 1 |
| Anions | | | | |
| ScPc$_2$ | 20 | | 450 | 2 |
| LuPc$_2$ | 22 | | 430 | 2 |
| YPc$^2$ | 22 | | 520 | 2 |
| GdPc$_2$ | 28 | | 490 | 2 |
| EuPc$_2$ | 28 | | 350 | 3 | a) for the near-IR intervalence band.

In the table, $\gamma$ represents the molecular hyperpolarizability and $\chi^{(3)}_{xxxx}$ represents the third order optical susceptibility measured for $2\times 10^{-4}$M solutions of the respective bis-phthalocyanines and their anions at 1.064 μm. $\sigma$ represents the absorption cross-section for the solutions at 1.064 μm and $\lambda$ indicates the peak wavelength of the near-IR intervalence band. $\alpha$ is the absorption coefficient at 1.064 μm.

The results in the table demonstrate that the bis-phthalocyanines possess enhanced third-order nonlinear optical susceptibilities, i.e., susceptibilities approaching an order of magnitude greater than a typical metal substituted monophthalocyanine. Furthermore, bis-phthalocyanine anion and cation solutions show susceptibilities of the same magnitude as the neutral lanthanide bis-phthalocyanines. These data indicate that the unpaired spin is not likely to be the source of the large nonlinear response and that while the intramolecular charge transfer band is a major contributor to the third-order nonlinear optical susceptibility, there are other important contributors as well. This data also indicates that the metal ion does not have an intrinsic contribution to the nonlinear optical response, acting instead as an "inert" spacer mediating inter-ring interactions. Calculations indicate that a 2-level population redistribution mechanism cannot account for the observed nonlinear response of the majority of the structured materials.

Although the present invention has been described relative to specific exemplary embodiments thereof, it will be understood by those skilled in the art that variations and modifications can be effected in these exemplary embodiments without departing from the scope and spirit of the invention.

What is claimed is:

1. An optical switch comprising:
   switching means, comprising of a pair of spaced, partially reflecting mirrors defining a cavity therebetween; and a body of nonlinear optical material which substantially fills said cavity for providing an open state wherein in response to light incident thereon of an intensity below a first level a substantial portion of the incident light passes therethrough, and for providing a closed state wherein in response to light incident thereon of an intensity greater than a second level a substantial portion of the incident light does not pass therethrough, said nonlinear optical material comprising a rare earth bis-phthalocyanine.

2. The optical switch of claim 1, wherein said switch employs incident light of more than one wavelength.

3. The optical switch of claim 1, wherein said nonlinear optical material comprises a solid rare earth bis-phthalocyanine.

4. The optical switch of claim 1, wherein said nonlinear optical material comprises a solution of a rare earth bis-phthalocyanine.

5. The optical switch of claim 1, wherein said nonlinear optical material comprises scandium bis-phthalocyanine.

6. The optical switch of claim 1, wherein said rare earth bis-phthalocyanine comprises lutetium bis-phthalocyanine.

7. The optical switch of claim 1, wherein said nonlinear optical material comprises ytterbium bis-phthalocyanine.

8. The optical switch of claim 1, wherein said nonlinear optical material comprises yttrium bi-phthalocyanine.

9. The optical switch of claim 1, wherein said rare earth bis-phthalocyanine comprises gadolinium bis-phthalocyanine.

10. The optical switch of claim 1, wherein said nonlinear optical material comprises europium bis-phthalocyanine.

11. The optical switch of claim 1, wherein said rare earth bis-phthalocyanine comprises neodymium bis-phthalocyanine.

* * * * *